Jan. 19, 1960     A. G. THOMAS     2,921,479
POWER TRANSMISSION DEVICE
Filed March 16, 1951     2 Sheets-Sheet 1
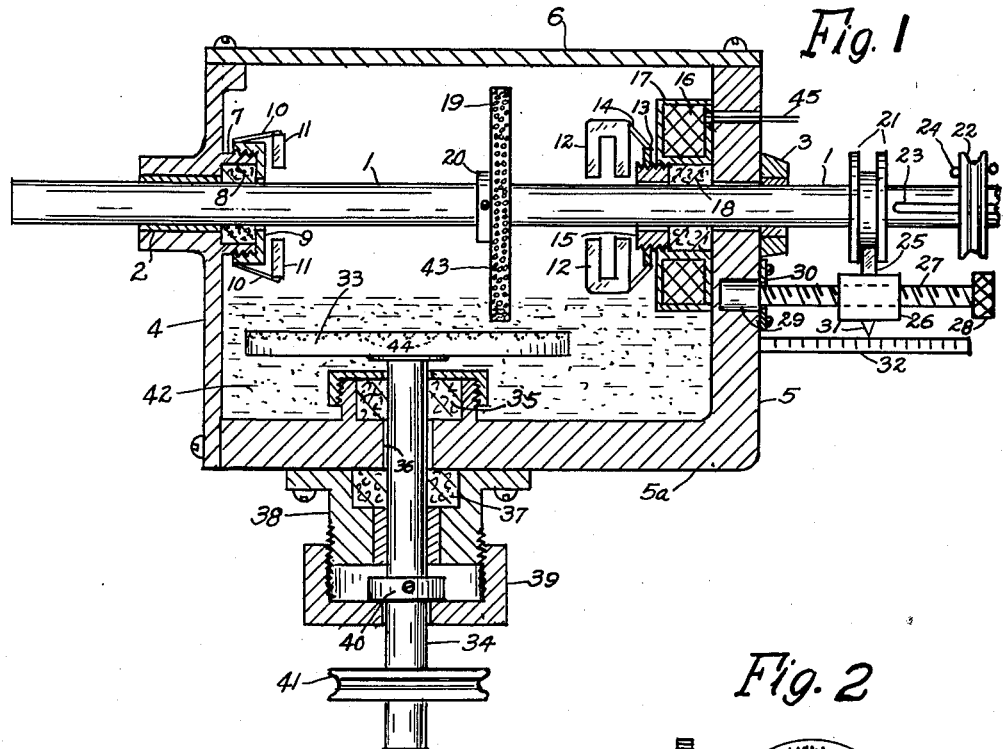
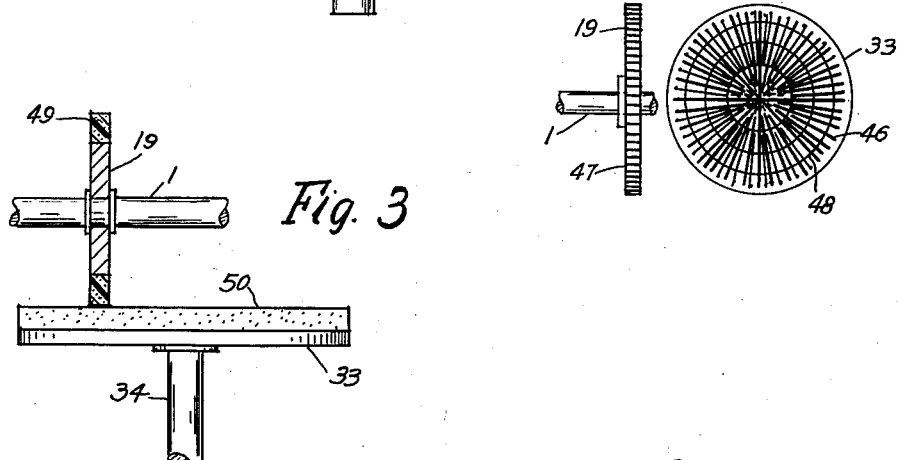
Albert G. Thomas INVENTOR.

Jan. 19, 1960   A. G. THOMAS   2,921,479
POWER TRANSMISSION DEVICE
Filed March 16, 1951   2 Sheets-Sheet 2
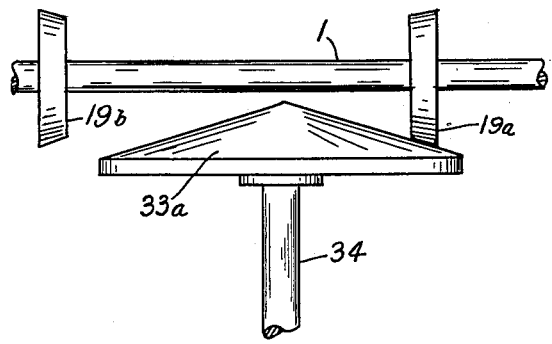
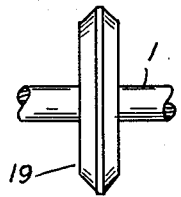
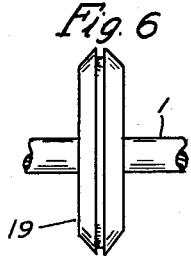
INVENTOR.
Albert G. Thomas

United States Patent Office 2,921,479
Patented Jan. 19, 1960

2,921,479

POWER TRANSMISSION DEVICE

Albert G. Thomas, Lynchburg, Va.

Application March 16, 1951, Serial No. 215,932

9 Claims. (Cl. 74—325)

This invention relates to power transmitting devices and has especial reference to variable ratio drives which may be adjusted in infinitely small steps.

Many adjustable power transmitting devices have been made but they have not been satisfactory in many cases since the belts, hydraulic mechanism, or other similar means usually employed allow slippage, cause considerable wear, overheat, or in many instances do not allow sufficient flexibility. In my invention however I offer novel means of overcoming past defects of power transmitting mechanisms by using magnetic forces, inertia, and other influences.

It is an object to provide a power transmitting device in which the drive ratio can be adjusted in infinitely small steps, including reverse, by magnetically binding the driving and driven element without appreciable slippage.

Another object is to provide an infinitely variable ratio drive which can also be adjusted to cause reverse rotation of the driven shaft or other element.

A further object is to provide a variable ratio drive having driving and driven elements of low inertia.

An additional object is the provision of a variable ratio drive mechanism in which there is little wear and little slippage.

Another object is the provision of a variable ratio drive mechanism which can be easily controlled without appreciable power loss.

Other objects will appear in the following description.

In the drawings:

Figure 1 is a side elevation, in part section, of an infinitely variable ratio drive mechanism employing magnetic forces to connect driving and driven discs connected to shafts.

Figure 2 is a top plan view of a modified driven disc, and gearlike driving disc seen edgewise, for use in a variable ratio drive as illustrated in Figure 1.

Figure 3 is an elevation, in part section, showing cooperating driving and driven discs having resilient magnetizable material in adjustable contact, for use also in a drive as illustrated in Figure 1.

Figure 4 is a fragmentary elevation showing driving and driven shafts with miter or bevel type discs attached.

Figure 5 is an edge elevation of a disc having a narrow edge, for use with the device shown in Figure 1.

Figure 6 is an edge elevation of a disc having a circumferential slot, for use with the device of Figure 1.

In Figure 1, shaft 1 is rotatable and slidable in bearings 2 and 3 which are, respectively, attached to brass or other non-magnetic end plate 4 and to iron or steel casing 5 of good magnetic permeability. Bearing 3 is also preferably made of brass or other non-magnetic material and the linings of the bearings may be of babbitt or any suitable material. End plate 4 is screwed or otherwise fastened to casing 5 in leak-proof manner and cover plate 6, which may be non-magnetic, is screwed to end plate 4 and to the top edge of casing 5 which may comprise three mutually perpendicular walls. Threaded sleeve 7 projects inwardly from wall or plate 4 and forms an annular space around shaft 1, in which packing material is pressed by apertured screw cap 9 surrounding the shaft and carrying attached spring strips 10 to which are fastened horse-shoe or other magnets 11 for the purpose of picking up any magnetic particles which may be adjacent.

Horse-shoe magnets 12 are similarly attached to threaded ring 13 by means of resilient strips 14. Ring 13 may be screwed onto threaded ring 15 surrounding shaft 1 and screwed into the threaded brass central tube of annular magnetizing winding 16 which is protected by a suitable metal or other casing 17 attached to the end wall of casing 5 as indicated. Ring 15 compresses cotton or other packing 18 to prevent leakage of liquid and to trap any magnetizable particles which might otherwise travel outward to bearing 3. As indicated, shaft 1, which is made of soft iron, steel or the like, of good magnetic permeability, is movable through a circular opening in casing 5 which is closely adjacent to the shaft to provide a relatively low reluctance air gap but which preferably is not in metallic contact with the shaft in order to avoid magnetic binding and also to prevent locking action which may be caused by stray particles.

Magnetizable iron or steel disc 19, preferably of good magnetic permeability and low retentivity, is fastened to shaft 1 coaxially therewith by means of attached collar 20 and a set screw or the like. Flanged collar or spool 21 is fixed coaxially to shaft 1 and moves with the shaft whereas pulley 22 is keyed to the shaft through axially parallel slot 23 in the shaft. Guide pins 24, attached to any suitable part of the device, prevent axial movement of pulley 22 but allow it to rotate with the shaft which is axially slidable through the pulley. Tongue 25 projecting from block 26 cooperates with the flanges of spool 21 to cause axial displacement of the spool and attached shaft 1, in either direction. Block 26 has a threaded bore the axis of which is parallel with the axis of shaft 1, and threaded rod 27, having integral knurled end knob 28, is screwed into the threaded bore of block 26 and terminates in integral cylindrical end piece 29 rotatable in a cylindrical recess in the outer face of casing 5. The length of end piece 29 is slightly less than the length of the recess so that annular retaining plate 30, surrounding threaded rod 27, serves to prevent end piece 29 from falling out of the recess but at the same time allows rotation of element 29 and integral rod 27. Plate 30 is screwed to the surface of casing 5. Pointer 31 is attached to block 26 and is movable with the block relative to scale 32 attached to the casing. Therefore the position of pointer 31 relative to scale 32 indicates the position of the shaft 1 and attached disc 19 relative to the device and especially with relation to cooperating disc 33 which is rigidly fastened to shaft 34 coaxially therewith. The axis of shaft 34 is preferably perpendicular to the axis of shaft 1.

Disc 33 is also made of soft iron or steel of high magnetic permeability and low retentivity, preferably, and shaft 34 is preferably of the same or similar iron or steel. Packing gland 35, similar to packing gland 7—8—9, is provided to retain oil or other fluid which may be placed in the casing and a circular opening 36 in the casing is of slightly larger diameter than shaft 34 so that the shaft is permitted axial and rotary displacement but without metallic contact with the casing, preferably. A small air gap is arranged in order to prevent excessive reluctance in the magnetic circuit. Packing 37 of cotton or other material is also placed in a recess in flanged bearing 38 which supports shaft 34 for rotary and axial movement. This packing is further protection against loss of liquid and also furnishes additional means for preventing metal particles in the casing from passing down to the bearing. This bearing is fastened to the lower surface of the casing by screws or bolts as indicated.

The shaft 34 passes through a central hole in internally threaded cap 39 which is adjustably screwed onto the threaded end of bearing 38 and may be fastened in any chosen position by a set screw. Collar 40 is fastened to shaft 34 by a set screw and, together with cap 39, serves as a stop to limit downward movement of shaft 34 and attached disc 33. The normal separation of disc 33 from disc 19, with winding 16 unenergized, can therefore be determined by the position of cap 39 relative to bearing 38 and also by the axial position of collar 40 relative to shaft 34. Collar 40 may be set so that disc 33 will be magnetically attracted to be in contact with disc 19 when winding 16 is energized or it may be set so that the upward movement of disc 33 is stopped before coming in contact with disc 19. Likewise, cap 39 may be screwed up on bearing 38 until there is little downward possible displacement of shaft 34 and disc 33 from their uppermost positions. Pulley 41 is fixed to shaft 34 but may be in fixed vertical position with a key working in a vertical slot in shaft 34, if desired. Material 42 comprises a mixture or suspension of iron or steel particles in oil, silicone fluid or the like.

Disc 19 is shown as having dimples or recesses 43 in its rim. These recesses may be rounded as indicated or they may be elongated and extended across the rim or edge, or nearly across. Similarly, dimples or recesses 44 may be provided in the upper or working surface of disc 33. These recesses may likewise be round or elongated or of any suitable shape and may be distributed over the entire upper face or surface of disc 33. The purpose of the recesses is to entrap iron particles when the discs are magnetized so that the entrapped, magnetized, more or less "solidified" groups of iron particles will act somewhat like gear teeth to provide positive driving action between the two discs. I have found, however, that good bonding or effective driving action is obtained when winding 16 is energized, even though the edge or rim of disc 19 and the upper face of disc 33 are smooth.

In operation, if winding 16 is energized with direct current, preferably through connected insulated wires 45 which are led out of the casing through a suitable opening, then magnetic flux will be caused to traverse heavy iron casing section 5 and heavy integral casing bottom 5a and across the air gap to shaft 34 and through that shaft and disc 33 to disc 19 and thence through shaft 1 to the winding 16. When the discs are magnetized the iron or steel particles between them, and immediately adjacent, will be aligned to form a strong connecting bond so that if one disc is rotated the other will also be rotated, with little slippage if the magnetization is sufficient. The device is operable with relatively weak magnetization. The driving action occurs even though disc 33 is limited in upward movement so that it can not directly engage the rim of disc 19. Since the disc 33 is surrounded by the liquid-magnetizable particle mixture or suspension, an ample supply of magnetic particles between the discs is assured, even though the effective particles at any one moment may be swept away the next moment due to the rotation of the discs. It is preferable that the liquid level be held below magnetizing winding 16 and shaft 1.

The axis of shaft 1 is preferably vertically above the center of disc 33 and the displacement of disc 19 in radial direction with respect to disc 33 can be regulated by turning knurled knob 28 so that block 26 and tongue 25 are displaced laterally, to the right or left, at the same time allowing rotation of spool 21 and attached shaft 1.

The pointer 31 is set relative to scale 32 at the desired "gear ratio" or drive ratio between the discs, and spool 21 in conjunction with tongue 25 will keep that setting. It is obvious that the ratio can be varied in infinitely small steps by turning knob 28. The winding 16 may be de-energized when such drive ratio changes are made.

If disc 19 is considered as the driving element, then the drive ratio will be at a minimum when disc 19 is near the outer radius or rim of disc 33 and the drive ratio will be at a maximum when disc 19 is adjacent the center of disc 33. When disc 19 is to the left of center of disc 33, the direction of rotation of driven disc 33 will be reversed, the speed of rotation of the driven disc being decreased in proportion to the displacement of disc 19 leftward of the center of disc 33, as seen in Figure 1. The length of rod 27 and the distance of spool 21 from bearing 3 can be greater than shown so that disc 19 can be displaced to the left for the whole radius to the left of the center of disc 33.

If disc 33 is allowed sufficient vertical movement, it will be magnetically attracted into contact with disc 19 so that a frictional driving action occurs, aided by the magnetic pull. This principle can be used in many clutches and drives of wide varieties. When winding 16 is de-energized, the force of gravity causes disc 33 to drop out of contact with disc 19. A spring could, however, be used to cause separation of the discs when winding 16 is de-energized. This mode of operation does not require the use of magnetic particles, but they will assist in producing a good driving engagement, due to edge magnetic fields, even though the discs are in contact. It is likewise not essential that the magnetic particles be suspended in oil or other liquid but the liquid has beneficial effects such as supplying mobility and cooling features as well as other desirable aspects.

Magnets 11 and 12 are arranged to attract iron particles away from shaft 1 in order to protect bearings 2 and 3, respectively. Suitable shields may be provided to protect the magnets from direct splashing by the mixture of liquid and magnetic particles. The magnets are resiliently mounted in order to prevent binding or locking of shaft 1. The magnets are not essential to the operation of the device, however. The horizontal arrangement of disc 33 is an advantage in that the iron or steel particles, if large enough to sink or fall when the device is not in operation, will settle on the face of disc 33 and so will be in position for immediate magnetic locking or driving action when winding 16 is energized. A raised rim, above the face of disc 33, can be provided if desired, in order to trap a substantial number of magnetizable particles over the face of the disc.

As shown in Figure 2, radical grooves 46 may be provided in the upper or working face of disc 33. These grooves may be of any suitable width and depth and are preferably arranged in various groups of different lengths in order to cover the working face more or less uniformly, from the standpoint of effectiveness. Similarly, disc 19 is provided with edge grooves or recesses 47 which may lie parallel with the axis of shaft 1, or otherwise. If then, these discs are used in the device shown in Figure 1, the iron or steel particles in adjacent or cooperating grooves of disc 19 and disc 33, respectively, become "solidified" when magnetized by flux produced by energized winding 16 and act virtually as gear teeth, causing the driving disc to rotate the driven disc and shaft. The grooves may be of uniform or tapered width. If desired, a plurality of closely spaced circular grooves 48 may be arranged at different radii in order to provide channels and reservoirs for supplying an adequate quantity of magnetizable particles at the contact line or area where the edge of disc 19 is in contact with or is immediately adjacent the face of disc 33.

As illustrated in Figure 3, disc 19 may have an attached rim or tire 49 comprising a resilient material like natural or synthetic rubber, or the like, admixed with iron, steel, or other magnetizable particles. These particles are preferably of silicon steel, soft iron, or the equivalent, having good magnetic permeability but which quickly lose their magnetism when not in a magnetizing field. Similarly, rubber or other preferably resilient disc 50, having admixed iron or other magnetizable particles, is cemented, bonded, or otherwise fastened to the upper face of iron or steel disc 33 which is fixed to shaft 34. These cooperating discs can be used in the device shown in Figure 1 and have the advantage that the softer material provides good frictional drive as well as good magnetic action tending to prevent slippage between tire 49 and disc 50. If the magnetizable particles are in rather heavy concentration throughout the rubber or other bonding material, a substantial magnetic flux will be carried by the composite material when winding 16 is energized. Disc 50 can be moved out of contact with tire 49 when it is desired to change the drive ratio. When magnetized, the resilient tire 49 and disc 50 are pulled toward each other, thereby stretching to some extent and adding to the pressure between the tire and disc, or the discs can be allowed to pull together.

As shown in Figure 4, the shaft 1 may have attached coaxial iron or steel discs 19a and 19b with oppositely mitered or bevelled edges which can be brought into working relationship with conically shaped iron or steel element 33a fastened coaxially to shaft 34. Shaft 34, by means of adjustable collars, or otherwise, can be adjusted vertically so that either disc 19a or 19b can be brought into contact with the conical surface of element 33a at any desired radius, in order to determine the drive ratio. The discs 19a and 19b are separated so that if either is in contact with element 33a the other is out of contact with that element. For example, if disc 19a is in driving relationship for forward rotation of shaft 34, disc 19b is displaced beyond the rim of element 33a. If reverse rotation of shaft 34 is desired, then shaft 1 is shifted to the right to bring disc 19b into contact with the upper conical face of element 33a at the desired radius, and disc 19a will have been moved to the right beyond the rim of element 33a which can be lifted or lowered. Magnetic or mechanical latches or clutches could of course be used to cause engagement or disengagement of either disc even though it is constantly in contact with element 33a. The bevelled construction has an advantage in that the diameter of the driving disc 19a, or 19b, increases as the radius of the contact point with element 33a increases from the center of that element and the effective driving width is greater. The construction of Figure 4 can be used in the device of Figure 1, similar parts being given similar numerals.

The disc 19 can have a somewhat sharp or narrow edge or rim as indicated in Figure 5 or it can have a circumferential slot as shown in Figure 6. The sharper edge will tend to concentrate the flux and to reduce slippage friction due to the different driving diameters, and the circumferential groove provides space for accumulation of magnetic particles.

It is obvious that various changes of details of construction can be made without departing from broad principles I have disclosed.

What I claim is:

1. A variable speed drive mechanism adapted to drive a shaft connected to a load, comprising a hollow housing including a base, a relatively large wheel mounted on a substantially vertical axis in said housing having its upper surface magnetized with a given polarity at the periphery, means rotatably supporting said wheel above said base, a rotatable power shaft extending substantially horizontally and slidably through said housing and having a relatively small wheel thereon within the housing above said large wheel, said small wheel being spaced from said large wheel and being magnetized with a polarity at the periphery opposite said first-named polarity, said housing having therein a quantity of an emulsion containing magnetizable particles to a level at least covering said large wheel and partly covering the periphery of said small wheel.

2. The mechanism set forth in claim 1, said small wheel having spaced serrations on the circumferential edge thereof.

3. The mechanism set forth in claim 1, said large wheel having spaced serrations on at least the radially outward portion of the upper surface thereof.

4. The mechanism set forth in claim 1, having means for varying the vertical position of said large wheel in said housing and hence for varying the vertical distance between said wheels.

5. The mechanism set forth in claim 1, said small wheel having spaced serrations on the circumferential edge thereof, said large wheel having radial serrations on the upper surface thereof.

6. The mechanism set forth in claim 1, having means for sliding said power shaft longitudinally and hence moving said small wheel toward or away from the axis of said large wheel.

7. The mechanism set forth in claim 5, said small wheel having spaced serrations on the circumferential edge thereof, said large wheel having radial serrations on the upper surface thereof.

8. The mechanism set forth in claim 5, having means for varying the vertical position of said large wheel in said housing and hence for varying the vertical distance between said wheels.

9. The mechanism set forth in claim 1, having yieldable means normally urging said large wheel downward toward said base and having means for raising said large wheel against the force of said yieldable means.

References Cited in the file of this patent

UNITED STATES PATENTS

| | | |
|---|---|---|
| 486,393 | De Bovet | Nov. 15, 1892 |
| 493,858 | Edison | Mar. 21, 1893 |
| 849,051 | Churchward | Apr. 2, 1907 |
| 1,249,174 | Murry | Dec. 4, 1917 |
| 1,288,129 | Murry | Dec. 17, 1918 |
| 1,296,850 | Rainey | Mar. 11, 1919 |
| 1,368,587 | Villiers | Feb. 15, 1921 |
| 1,424,027 | Murphy | July 25, 1922 |
| 1,840,726 | Lange | Jan. 12, 1932 |
| 1,886,692 | Kapitza et al. | Nov. 8, 1932 |
| 2,167,641 | Dewan | Aug. 1, 1939 |
| 2,180,474 | Leece | Nov. 21, 1939 |
| 2,411,055 | Rich | Nov. 12, 1946 |
| 2,510,675 | Baruch | June 6, 1950 |
| 2,532,876 | Asche et al. | Dec. 5, 1950 |
| 2,543,394 | Winther | Feb. 27, 1951 |
| 2,548,373 | Hurvitz | Apr. 10, 1951 |
| 2,557,140 | Razdowitz | June 19, 1951 |
| 2,566,441 | Camras | Sept. 4, 1951 |
| 2,580,869 | Winther | Jan. 1, 1952 |
| 2,605,876 | Becker | Aug. 5, 1952 |
| 2,616,539 | Wattenberg | Nov. 4, 1952 |
| 2,749,764 | Chou | June 12, 1956 |

OTHER REFERENCES

Transactions of A.I.E.E., vol. 67, pages 1–3, December 13, 1948. (Copy in Division 24.)

National Bureau of Standards, Technical News Bulletin, vol. 34, No. 12, December, 1950. (Copy in Division 24.)